(12) United States Patent
Jin et al.

(10) Patent No.: US 12,031,637 B1
(45) Date of Patent: Jul. 9, 2024

(54) TWO-DIMENSIONAL ELECTRO-HYDRAULIC SERVO VALVE BASED ON DUAL REDUNDANCY TRANSMISSION MECHANISM

(71) Applicants: HANGZHOU CITY UNIVERSITY, Hangzhou (CN); ZHEJIANG UNIVERSITY, Hangzhou (CN)

(72) Inventors: Qilin Jin, Hangzhou (CN); Qiang Zuo, Hangzhou (CN); Qianqian Lu, Hangzhou (CN); Yu Huang, Hangzhou (CN); Longlong Leng, Hangzhou (CN); Jiaqi Hu, Hangzhou (CN); Yongzhuang Liu, Hangzhou (CN); Binbin Chen, Hangzhou (CN)

(73) Assignees: HANGZHOU CITY UNIVERSITY, Hangzhou (CN); ZHEJIANG UNIVERSITY, Hangzhou (CN)

( * ) Notice: Subject to any disclaimer, the term of this patent is extended or adjusted under 35 U.S.C. 154(b) by 0 days.

(21) Appl. No.: 18/540,768

(22) Filed: Dec. 14, 2023

(30) Foreign Application Priority Data

Jun. 25, 2023 (CN) .......................... 202310746082.3

(51) Int. Cl.
*F16K 31/04* (2006.01)
*F15B 13/04* (2006.01)
(Continued)

(52) U.S. Cl.
CPC ........ *F16K 31/043* (2013.01); *F15B 13/0402* (2013.01); *F15B 13/0406* (2013.01);
(Continued)

(58) Field of Classification Search
CPC .... F16K 31/043; F16K 11/078; F16K 31/047; F16K 31/40; F15B 13/0402;
(Continued)

(56) References Cited

U.S. PATENT DOCUMENTS 9,970,464 B1 * 5/2018 Ruan ................... F15B 13/0433
2020/0355292 A1 11/2020 Lindoerfer et al.

FOREIGN PATENT DOCUMENTS

CN 106122146 A 12/2016
CN 106438625 A 2/2017
(Continued)

OTHER PUBLICATIONS

Zuo, Xiqing et al. "2D Electrical Characterization of hydraulic servo flow valve" vol. 02, No. 400-406 Page, Issue date Feb. 25, 2017.

*Primary Examiner* — John Bastianelli

(57) ABSTRACT

A two-dimensional electro-hydraulic servo valve based on a dual-redundancy transmission mechanism, including a valve body, a valve spool inside the valve body, and a valve sleeve on an outside of the valve spool. A low-pressure chamber is disposed between the valve spool and the valve sleeve; the valve body is connected to a servomotor through a transmission mechanism; the transmission mechanism includes a spool fork and a motor toggle, and each end of the motor toggle is connected to a spherical connector; the spherical connector is rotatable with a centerline of a connection end of the motor toggle as an axis; each end of the spool fork is slidably connected to a corresponding spherical connector; a middle part of the spool fork is connected to the valve spool, and a middle part of the motor toggle is connected to a rotor of the servomotor.

6 Claims, 3 Drawing Sheets

(51) Int. Cl.
  *F15B 13/044*  (2006.01)
  *F16K 11/078*  (2006.01)
  *F16K 31/40*  (2006.01)

(52) U.S. Cl.
  CPC ........ *F15B 13/0444* (2013.01); *F16K 11/078* (2013.01); *F16K 31/047* (2013.01); *F16K 31/40* (2013.01)

(58) Field of Classification Search
  CPC .. F15B 13/0406; F15B 13/0444; F15B 13/02; F15B 13/04
  USPC ........................................ 251/129.11–129.13
  See application file for complete search history.

(56) References Cited

FOREIGN PATENT DOCUMENTS

| | | |
|---|---|---|
| CN | 111433500 A | 7/2020 |
| CN | 114718933 A | 7/2022 |
| CN | 115653958 A | 1/2023 |

\* cited by examiner

TWO-DIMENSIONAL ELECTRO-HYDRAULIC SERVO VALVE BASED ON DUAL REDUNDANCY TRANSMISSION MECHANISM

CROSS REFERENCE TO RELATED APPLICATION

The present disclosure claims priority of Chinese Patent Applications No. 202310746082.3, filed on Jun. 25, 2023, the entire contents of which are hereby incorporated by reference in their entirety.

TECHNICAL FIELD

The present disclosure relates to the technical field of electro-hydraulic servo valves, and in particular to a two-dimensional electro-hydraulic servo valve based on a dual redundancy transmission mechanism.

BACKGROUND

Electro-hydraulic servo valve is a key component in electro-hydraulic servo control, which is a kind of hydraulic control valve that accepts analog electric signal and outputs modulated flow and pressure accordingly. The electro-hydraulic servo valve has the advantages of fast dynamic response, high control accuracy, long service life, etc., and has been widely applied in electro-hydraulic servo control systems in aviation, aerospace, ships, metallurgy, chemical industry, and other fields.

For an existing two-dimensional electro-hydraulic servo valve, rack and pinion, upper toggle and lower fork, and other transmission mechanisms are mostly used between the spool and the motor, which can amplify the torque output from an electro-mechanical converter (stepping motor, servomotor) to realize that the torque signal output from the motor is transferred to the two-dimensional servo valve as an input; in addition, the spool is given a larger driving torque to be driven to rotate.

However, the rack and pinion transmission mechanism will produce relative sliding between the tooth surfaces while conducting meshing motion, thereby causing a large increase in the friction between the rack and pinion; moreover, due to the existence of a gap between the rack and pinion, the transmission mechanism is not sufficiently balanced, affecting the movement of the spool, thereby generating a large hysteresis loop; furthermore, the rack and pinion may produce a stripped tooth or occlusion phenomenon during the transmission process, which affects the axial movement of the spool. Regarding the processing technology, the cost of processing the rack and pinion is high, which makes the production cost of the servo valve increase.

Although the upper toggle and lower fork transmission mechanism, compared to the rack and pinion mechanism, greatly reduces the complexity of processing, but it is still a line contact between the arc surface of the toggle and the two surfaces of the fork; in a rotation process of the toggle and fork, there is relative sliding between the two, and friction between the two is large, resulting in wear and tear of parts and short life in the long-term use; in addition, the transmission mechanism can cause problems such as rotation stall and excessive spool radial force due to geometric deviations.

SUMMARY OF THE DISCLOSURE

In view of the deficiencies in the related art, the present disclosure aims to provide a two-dimensional electro-hydraulic servo valve based on a dual-redundancy transmission mechanism, which may improve the service life of the two-dimensional electro-hydraulic servo valve.

In order to solve the above technical problems, the present disclosure is realized by the following technical solutions.

A two-dimensional electro-hydraulic servo valve based on a dual-redundancy transmission mechanism, including: a valve body, a valve spool arranged inside the valve body, and a valve sleeve disposed on an outside of the valve spool; wherein a low-pressure chamber is disposed between the valve spool and the valve sleeve; the valve body is connected to a servomotor through a transmission mechanism; the transmission mechanism includes a spool fork and a motor toggle, and each end of the motor toggle is connected to a spherical connector; the spherical connector is rotatable with a centerline of a connection end of the motor toggle as an axis; each end of the spool fork is slidably connected to a corresponding spherical connector; a middle part of the spool fork is connected to the valve spool, and a middle part of the motor toggle is connected to a rotor of the servomotor.

In some embodiments, each end of the spool fork defines a rolling groove matching with a corresponding spherical connector, and the rolling groove is slidably connected to the corresponding spherical connector.

In some embodiments, the middle part of the spool fork is connected to the valve spool through a cantilever rod member, a rod body of the cantilever rod member extending into an interior of a center hole of the valve spool and being fixedly connected to the valve spool.

In some embodiments, an end of the cantilever rod member is arranged with a fork axial positioning tab, and a stepped surface of the fork axial positioning tab abuts against a side of the spool fork; the other end of the cantilever rod member is arranged with a shoulder, and the shoulder is fixedly connected to the valve spool through a positioning pin.

In some embodiments, an oil return gap is defined between the rod body of the cantilever rod member and a hole wall of the center hole of the valve spool, and the valve spool defines an oil return hole correspondingly on each of both opposite sides of the shoulder of the cantilever rod member, and the oil return hole is connected to the low-pressure chamber.

In some embodiments, a first connection hole is defined on the middle part of the spool fork, and the cantilever rod member is fixedly connected to the spool fork through the first connection hole; a second connection hole is defined on the middle part of the motor toggle, and the rotor of the servomotor is fixedly connected to the motor toggle through the second connection hole.

In some embodiments, a groove wall on each end of the rolling groove is in point contact with an outer wall of a corresponding spherical connector.

In some embodiments, a designed travel distance exists between an outer wall of the spherical connector and a groove bottom of the rolling groove along an axial direction of the valve spool for an axial movement of the valve spool.

In some embodiments, each end of the motor toggle is arranged with a connecting member, and a corresponding spherical connector is connected to the motor toggle through the connecting member.

In some embodiments, an outer side of the transmission mechanism is arranged with a sleeve; a side of the sleeve is connected to the valve body, and the other side of the sleeve is connected to a motor housing of the servomotor.

The present disclosure has the following advantages and beneficial effects compared with the related art.

1, the spool fork and the spherical connector are in point contact; when the motor toggle and the spool fork rotate, the spherical connector produces relative rotation between two side surfaces of the spool fork, which effectively reduces the friction between the spool fork and the spherical connector, thereby reducing the wear of the spherical connector, increasing the service life of the spherical connector, and thus increasing the service life of the two-dimensional electro-hydraulic servo valve.

2, the spool fork and motor toggle are symmetrical structures, compared to the existing upper toggle and lower fork transmission mechanism, the input of the servo valve is changed from a driving torque to a driving force coupling, which eliminates the radial force generated on the valve spool by the driving torque of the valve spool, thereby reducing the friction between the valve spool and the valve sleeve, which in turn reduces the wear and tear between the valve spool and the valve sleeve, and increases the service life of the two-dimensional electro-hydraulic servo valve.

3, the middle part of the spool fork is connected to the valve spool through the cantilever rod member, and the rod body of the cantilever rod member extends into the inside of the center hole of the valve spool and is fixedly connected to the valve spool. Because the cantilever rod member has a certain degree of deflection, it can eliminate the problem of rotational sticking due to geometric dimensions and form and position tolerances.

Figure 1:
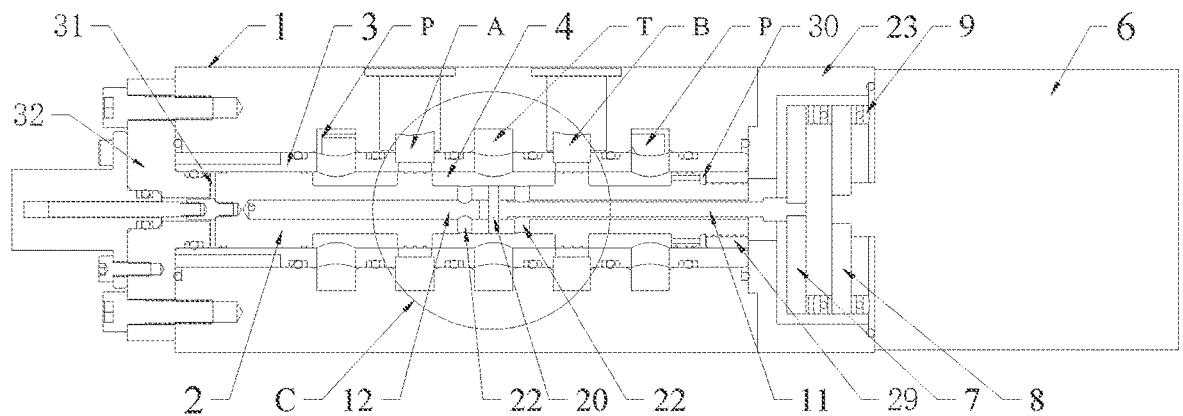
FIG. 1 is a typical sectional structural schematic view according to the present disclosure.

Reference numerals: 1-valve body; 2-valve spool; 3-valve sleeve; 4-low-pressure chamber; 5-transmission mechanism; 6-servomotor; 7-spool fork; 8-motor toggle; 9-spherical connector; 10-rolling groove; 11-cantilever rod member; 12-center hole; 13-fork axial positioning tab; 14-stepped surface; 15-shoulder; 16-oil return gap; 17-first connection hole; 18-second connection hole; 19-connecting member; 20-positioning pin; 21-rotor; 22-oil return hole; 23-sleeve; 24-high-pressure hole; 25-low-pressure hole; 26-sleeve helical groove; 27-first side wall; 28-second side wall; 29-concentric ring; 30-high-pressure chamber; 31-sensitive chamber; 32-end cap.

DETAILED DESCRIPTION

In order to enable those skilled in the art to better understand the technical solution of the present disclosure, the following describes some implementations of the present disclosure in combination with specific embodiments, but it should be understood that the accompanying drawings are only used for exemplary illustration, and should not be construed as a limitation on the present disclosure; in order to better illustrate the present embodiments, certain parts of the accompanying drawings will be omitted, enlarged, or reduced, and do not represent the dimensions of the actual product; for those skilled in the art, it is understandable that certain well-known structures and their descriptions in the accompanying drawings may be omitted. The positional relationships depicted in the accompanying drawings are for illustrative purposes only and are not to be construed as a limitation of the present disclosure.

The following is a further description of the present disclosure in conjunction with the accompanying drawings and embodiments, which is not to be taken as a limitation of the present disclosure.

As shown in FIGS. 1 to 8, provided is a two-dimensional electro-hydraulic servo valve based on a dual-redundancy transmission mechanism, including a valve body 1, a valve spool 2 arranged inside the valve body 1, and a valve sleeve 3 disposed on an outside of the valve spool 2; a low-pressure chamber 4 is disposed between the valve spool 2 and the valve sleeve 3; the valve body 1 is connected to a servomotor 6 through a transmission mechanism 5; the transmission mechanism 5 includes a spool fork 7 and a motor toggle 8, and each end of the motor toggle 8 is connected to a spherical connector 9; the spherical connector 9 is rotatable with a centerline of a connection end of the motor toggle 8 as an axis; each end of the spool fork 7 is slidably connected to a corresponding spherical connector 9; a middle part of the spool fork 7 is connected to the valve spool 2, and a middle part of the motor toggle 8 is connected to a rotor 21 of the servomotor 6; the spherical connector 9 is rotatably connected to a corresponding end of the motor toggle 8, and a rotation center of the spherical connector 9 is coaxially arranged with the centerline of the motor toggle 8.

Each end of the spool fork 7 defines a rolling groove 10 matching with a corresponding spherical connector 9, and the rolling groove 10 is slidably connected to the spherical connector 9.

The middle part of the spool fork 7 is connected to the valve spool 2 through a cantilever rod member 11, a rod body of the cantilever rod member 11 extending into an interior of a center hole 12 of the valve spool 2 and being fixedly connected to the valve spool 2. The cantilever rod member 11 has a large rotational stiffness to transmit a rotational torque to the valve spool 2 and has an elasticity that eliminates rotational sticking due to geometrical dimensions and form and position tolerances.

An end of the cantilever rod member 11 is arranged with a fork axial positioning tab 13, and a stepped surface 14 of the fork axial positioning tab 13 abuts against a side of the spool fork 7; the other end of the cantilever rod member 11 is arranged with a shoulder 15, and the shoulder 15 is fixedly connected to the valve spool 2 through a positioning pin 20.

An oil return gap 16 is defined between the rod body of the cantilever rod member 11 and a hole wall of the center hole 12 of the valve spool 2, and the valve spool 2 defines an oil return hole 22 correspondingly on each of both opposite sides of the shoulder 15 of the cantilever rod member 11, and the oil return hole 22 is connected to the low-pressure chamber 4.

In the embodiments, the servomotor 6 is adopted with a wet rotor structure, which may increase the heat dissipation of the hydraulic fluid while avoiding the problem of high-pressure dynamic sealing of the device, thereby improving the overall reliability of the device. Therefore, the oil return hole 22 on a right side of the device is configured to pass the low-pressure oil from the low-pressure chamber 4 into the interior of the servomotor 6 (rotor chamber); the oil return hole 22 on a left side of the device is configured to pass the low-pressure oil from the low-pressure chamber 4 into a low-pressure hole 25.

A first connection hole 17 is defined on the middle part of the spool fork 7, and the cantilever rod member 11 is fixedly connected to the spool fork 7 through the first connection hole 17; a second connection hole 18 is defined on the middle part of the motor toggle 8, and the rotor 21 of the servomotor 6 is fixedly connected to the motor toggle 8 through the second connection hole 18. The cantilever rod member 11, the valve spool 2, the first connection hole 17, the second connection hole 18, and the rotor 21 of the servomotor 6 are coaxially provided.

A groove wall on each end of the rolling groove 10 is in point contact with an outer wall of a corresponding spherical connector 9. That is, when the valve spool 2 is in an equilibrium position, the outer wall of each spherical connector 9 is in point contact with a first side wall 27 and a second side wall 28 of the rolling groove 10, and there is no pressure exerted on the first side wall 27 and the second side wall 28.

A designed travel distance exists between the outer wall of the spherical connector 9 and a groove bottom of the rolling groove 10 along an axial direction of the valve spool 2 for axial movement of the valve spool 2.

Each end of the motor toggle 8 is arranged with a connecting member 19, and a corresponding spherical connector 9 is connected to the motor toggle 8 through the connecting member 19.

An outer side of the transmission mechanism 5 is arranged with a sleeve 23; a side of the sleeve 23 is connected to the valve body 1, and the other side of the sleeve 23 is connected to a motor housing of the servomotor 6.

Figure 2:
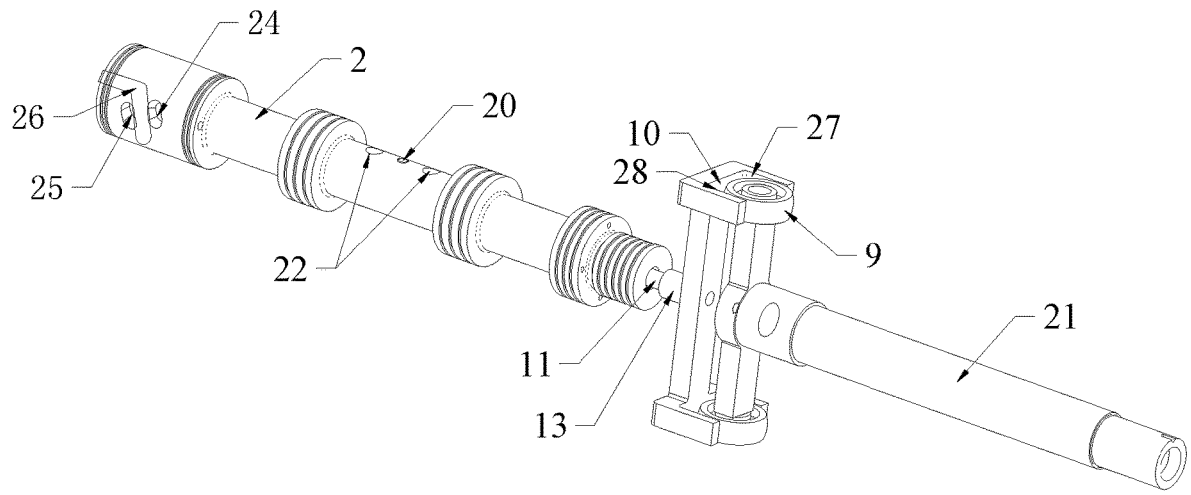
FIG. 2 is a structural schematic view of a transmission mechanism connected with a valve spool and a rotor according to the present disclosure.
Figure 3:
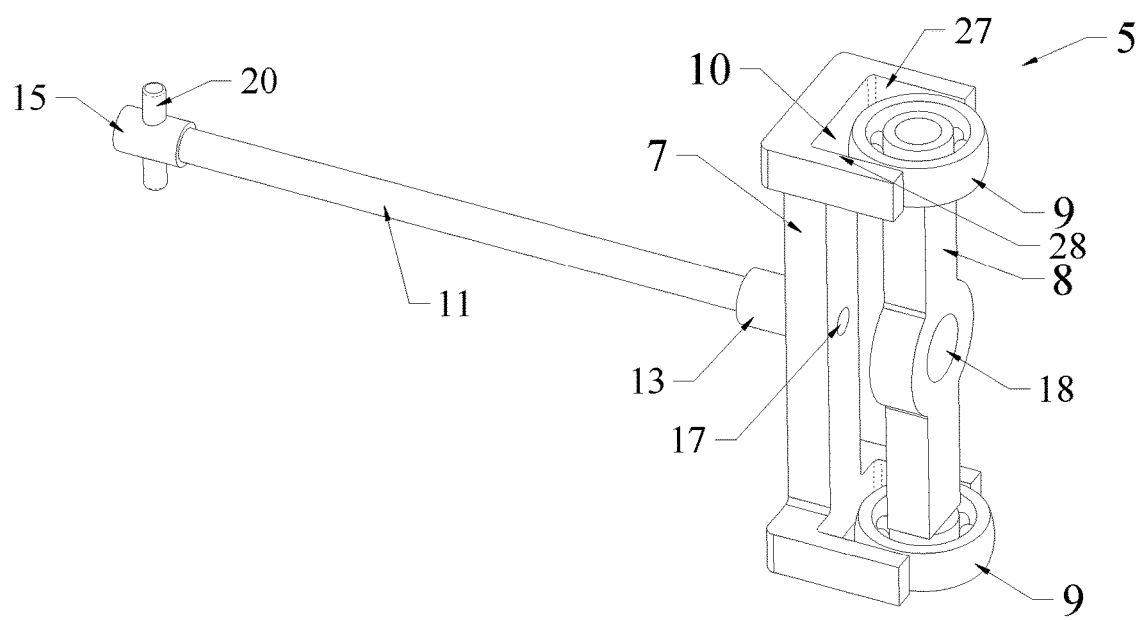
FIG. 3 is a schematic view of a connection between a transmission mechanism and a cantilever rod member according to the present disclosure.
Figure 4:
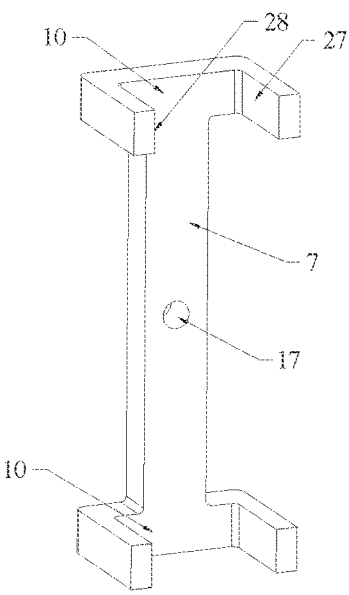
FIG. 4 is a structural schematic view of a spool fork of according to the present disclosure.
Figure 5:
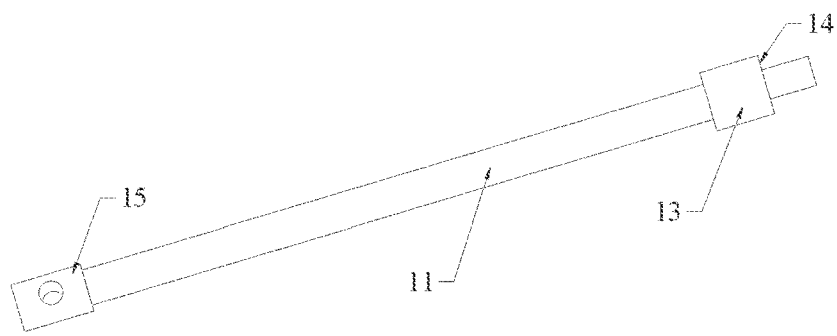
FIG. 5 is a structural schematic view of a cantilever rod member according to the present disclosure.
Figure 6:
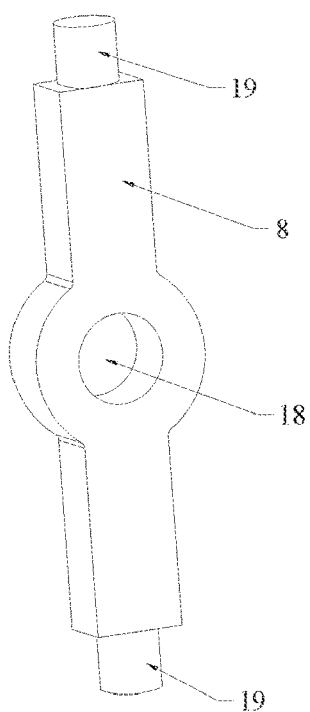
FIG. 6 is a structural schematic view of a motor toggle according to the present disclosure.
Figure 7:
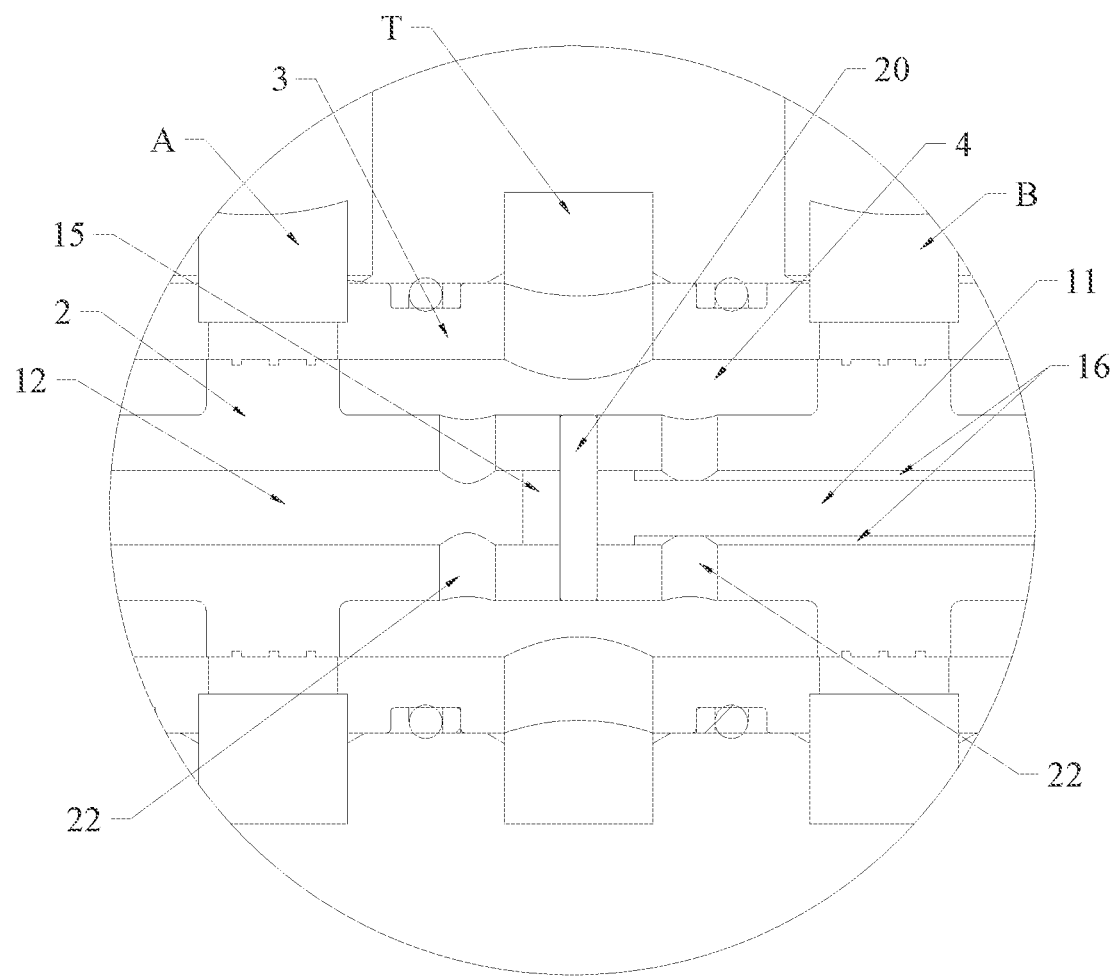
FIG. 7 is a partially enlarged view at C in FIG. 1.
Figure 8:
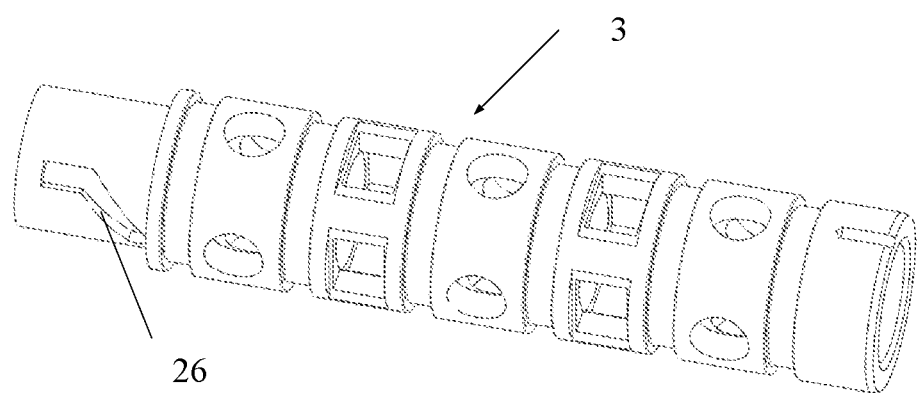
FIG. 8 is a structural schematic view of a valve sleeve 3 according to the present disclosure.

As shown in FIGS. 1, 2, and 8, illustrated are a system pressure port P, working oil ports A and B, and an oil return pressure port T. When the servomotor 6 has no control signal, the valve spool 2 is in a zero position; a high-pressure hole 24 of the valve spool 2 has an intersection area with a sleeve helical groove 26 of the valve sleeve 3, and a low-pressure hole 25 of the valve spool 2 has an intersection area with the valve sleeve helical groove 26; since the two intersecting areas are the same, the pressure of the valve spool 2 at the left end of the valve spool 2 is one half of the system pressure P, and the pressure of the right end of the valve spool 2 is constant at P; while the effective area of a high-pressure chamber 30 at the right end of the valve spool 2 is only half of the effective area of a sensitive chamber 31 at the left end of the valve spool 2; in this way, the valve spool 2 is in equilibrium.

The working process of the two-dimensional electro-hydraulic servo valve of the present disclosure with an electro-mechanical converter is specified as follows.

1, the servomotor 6 drives the motor toggle 8 to rotate clockwise (viewed from the right to the left); since each of the two ends of the motor toggle 8 is in point contact with the inner side wall of the rolling groove 10 of the spool fork 7 through the spherical connector 9, thereby driving the spool fork 7 to rotate clockwise (viewed from the right to the left); the middle part of the spool fork 7 is fixedly connected to the valve spool 2 through the cantilever rod member 11, thereby causing the valve spool 2 to rotate clockwise (viewed from the right to the left).

When the valve spool 2 follows the spool fork 7 to rotate clockwise (viewed from the right to the left), the intersection area between the high-pressure hole 24 on a step of the valve spool 2 and the sleeve helical groove 26 decreases, the intersection area between the low-pressure hole 25 and the sleeve helical groove 26 increases, the pressure in the sensitive chamber 31 on the left end of the valve spool 2 decreases (the sensitive chamber 31 including a combination of the valve spool 2, the valve sleeve 3, and an end cap 32, where the end cap 32 is arranged covering an end of the valve body 1 opposite to the servomotor 6), and the high-pressure chamber 30 on the right end of the valve spool 2 has a constant pressure (the high-pressure chamber 30 including a combination of the valve spool 2, the valve sleeve 3, and a concentric ring 29, where the concentric ring 29 is concentrically sleeved on the right end of the valve spool 2); therefore, the valve spool 2 moves axially to the left under an action of the unbalanced liquid pressure in the left and right chambers, while pulling the spool fork 7 to move together to the left through the cantilever rod member 11; during the movement of the spool fork 7, since the spherical connector 9 has a positive pressure on the first side wall 27 of the rolling groove 10, the first side wall 27 of the rolling groove 10 exerts a friction force on the spherical connector 9, thereby causing the spherical connector 9 to rotate counterclockwise with the motor toggle 8 as an axis (viewed from the top to the bottom).

2, the servomotor 6 drives the motor toggle 8 to rotate counterclockwise (viewed from the right to the left); since each of the two ends of the motor toggle 8 is in point contact with the inner side wall of the rolling groove 10 of the spool fork 7 through the spherical connector 9 (during the counterclockwise rotation, the spherical connector 9 exerts a positive pressure on the second side wall 28 of the rolling groove 10), which in turn drives the spool fork 7 to rotate counterclockwise (viewed from the right to the left); the middle part of the spool fork 7 is fixedly connected to the valve spool 2 through cantilever member 11, thereby causing the valve spool 2 to rotate counterclockwise (viewed from the right to the left).

When the valve spool 2 follows the spool fork 7 to rotate counterclockwise (viewed from the right to the left), the intersection area between the high-pressure hole 24 on the step of the valve spool 2 and the sleeve helical groove 26 increases, the intersection area between the low-pressure hole 25 and the sleeve helical groove 26 decreases, the pressure in the sensitive chamber 31 on the left end of the valve spool 2 increases, and the pressure in the high pressure chamber 30 on the right end of the valve spool 2 is constant; therefore, the valve spool 2 moves axially to the right under the action of the unbalanced hydraulic pressure in the two left and right chambers, while pulling the spool fork 7 to move together to the right through the cantilever rod member 11; during the movement of the spool fork 7, since the spherical connector 9 has a positive pressure on the second side wall 28 of the rolling groove 10, the second side wall 28 of the rolling groove 10 exerts a friction force on the spherical connector 9, thereby causing the spherical connector 9 to rotate clockwise with the motor toggle 8 as an axis.

In summary, when the spool fork 7 is moved to the left, the distance between the groove bottom of the rolling groove 10 and the spherical connector 9 gradually increases; when the spool fork 7 is moved to the right, the distance between the groove bottom of the rolling groove 10 and the spherical connector 9 gradually decreases. Therefore, the outer wall of the spherical connector 9 and the groove bottom of the rolling groove 10 have a designed travel distance that satisfies the axial movement of the valve spool 2.

Based on the description of the present disclosure and the accompanying drawings, those skilled in the art can easily manufacture or use the two-dimensional electro-hydraulic servo-valve based on a dual-redundancy transmission mechanism of the present disclosure, and is capable of producing the positive effects documented in the present disclosure.

The foregoing is only some embodiments of the present disclosure, and is not a limitation of the present disclosure in any form. Any simple modification or equivalent change to the above embodiments based on the technical substance of the present disclosure falls within the scope of the present disclosure.

What is claimed is:

1. A two-dimensional electro-hydraulic servo valve based on a dual-redundancy transmission mechanism, comprising: a valve body (1), a valve spool (2) arranged inside the valve body (1), and a valve sleeve (3) disposed on an outside of the valve spool (2);

wherein a low-pressure chamber (4) is disposed between the valve spool (2) and the valve sleeve (3); the valve body (1) is connected to a servomotor (6) through a transmission mechanism (5); the transmission mechanism (5) comprises a spool fork (7) and a motor toggle (8), and each end of the motor toggle (8) is connected to a spherical connector (9); the spherical connector (9) is rotatable with a centerline of a connection end of the motor toggle (8) as an axis; each end of the spool fork (7) is slidably connected to a corresponding spherical connector (9); a middle part of the spool fork (7) is connected to the valve spool (2), and a middle part of the motor toggle (8) is connected to a rotor (21) of the servomotor (6);

wherein each end of the spool fork (7) defines a rolling groove (10) matching with a corresponding spherical connector (9), and the rolling groove (10) is slidably connected to the corresponding spherical connector (9); a groove wall on each end of the rolling groove (10) is in point contact with an outer wall of a corresponding spherical connector (9);

wherein the middle part of the spool fork (7) is connected to the valve spool (2) through a cantilever rod member (11), a rod body of the cantilever rod member (11) extending into an interior of a center hole (12) of the valve spool (2) and being fixedly connected to the valve spool (2); an end of the cantilever rod member (11) is arranged with a fork axial positioning tab (13), and a stepped surface (14) of the fork axial positioning tab (13) abuts against a side of the spool fork (7); the other end of the cantilever rod member (11) is arranged with a shoulder (15), and the shoulder (15) is fixedly connected to the valve spool (2) through a positioning pin (20).

2. The two-dimensional electro-hydraulic servo valve according to claim 1, wherein an oil return gap (16) is defined between the rod body of the cantilever rod member (11) and a hole wall of the center hole (12) of the valve spool (2), and the valve spool (2) defines an oil return hole (22) correspondingly on each of both opposite sides of the shoulder (15) of the cantilever rod member (11), and the oil return hole (22) is connected to the low-pressure chamber (4).

3. The two-dimensional electro-hydraulic servo valve according to claim 1, wherein a first connection hole (17) is defined on the middle part of the spool fork (7), and the cantilever rod member (11) is fixedly connected to the spool fork (7) through the first connection hole (17); a second connection hole (18) is defined on the middle part of the motor toggle (8), and the rotor (21) of the servomotor (6) is fixedly connected to the motor toggle (8) through the second connection hole (18).

4. The two-dimensional electro-hydraulic servo valve according to claim 1, wherein a designed travel distance exists between an outer wall of the spherical connector (9) and a groove bottom of the rolling groove (10) along an axial direction of the valve spool (2) for an axial movement of the valve spool (2).

5. The two-dimensional electro-hydraulic servo valve according to claim 1, wherein each end of the motor toggle (8) is arranged with a connecting member (19), and a corresponding spherical connector (9) is connected to the motor toggle (8) through the connecting member (19).

6. The two-dimensional electro-hydraulic servo valve according to claim 1, wherein an outer side of the transmission mechanism (5) is arranged with a sleeve (23); a side of the sleeve (23) is connected to the valve body (1), and the other side of the sleeve (23) is connected to a motor housing of the servomotor (6).

* * * * *